N. A. WRIGHT.
AUTOMATIC CUT-OUT.
APPLICATION FILED JULY 12, 1909. RENEWED AUG. 12, 1910.
971,872. Patented Oct. 4, 1910.
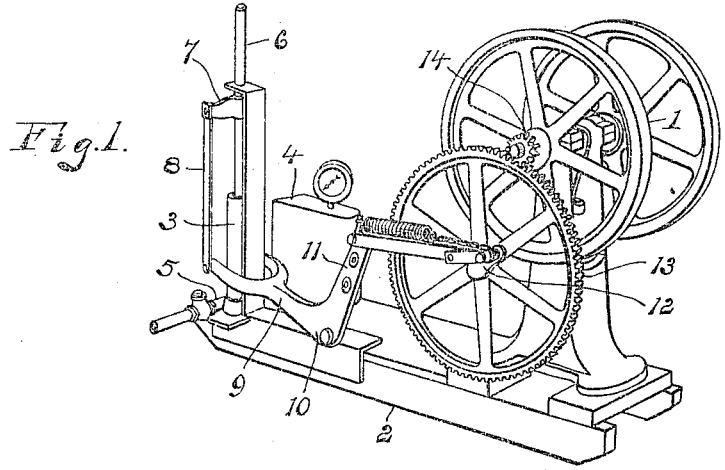
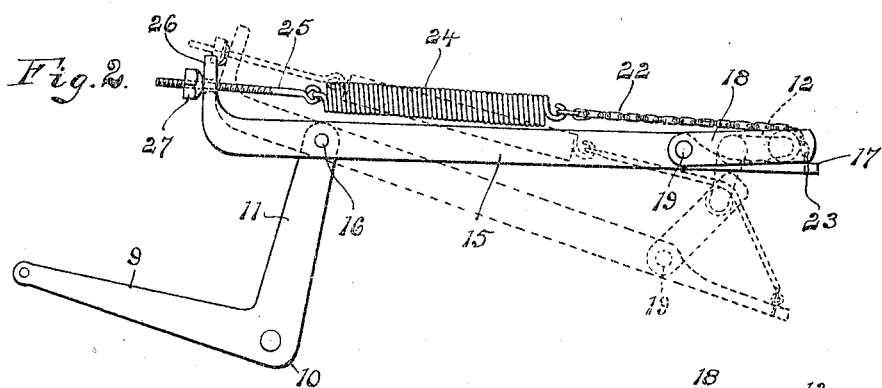
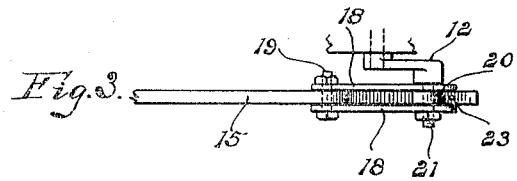

UNITED STATES PATENT OFFICE.

NORMAN A. WRIGHT, OF PONTIAC, MICHIGAN, ASSIGNOR TO CHAMPION MANUFACTURING COMPANY, OF PONTIAC, MICHIGAN, A CORPORATION OF MICHIGAN.

AUTOMATIC CUT-OUT.

971,872. Specification of Letters Patent. Patented Oct. 4, 1910.

Application filed July 12, 1909, Serial No. 507,055. Renewed August 12, 1910. Serial No. 576,909.

*To all whom it may concern:*

Be it known that I, NORMAN A. WRIGHT, a citizen of the United States of America, residing at Pontiac, in the county of Oakland and State of Michigan, have invented certain new and useful Improvements in Automatic Cut-Outs, of which the following is a specification, reference being had therein to the accompanying drawings.

This invention relates to improved means for automatically stopping the transmission by a connecting rod, of power from a continuously rotated crank when the resistance to the movement of the rod reaches a predetermined amount, so that when power is being applied, as for example, to an air pump to create an air pressure in a tank, a constant pressure may be maintained by a continuously running motor.

The object of the invention is to provide a very simple, efficient and inexpensive device for the purpose having certain new and useful features all as hereinafter more fully described, reference being had to the accompanying drawings in which, Figure 1 is a perspective view of a spraying apparatus employing a device embodying the invention; Fig. 2 is a side elevation of a device embodying the invention; and Fig. 3 is a detail showing one end of the same in plan view.

For the purpose of illustrating its use and operation, I have shown the device embodying the invention as applied to a spraying apparatus especially designed for use in spraying trees, plants, shrubs etc., but I do not limit myself to such application as it will be evident that the invention may be used wherever it is desired to automatically stop the transmission of power from a continuously rotated crank to a movable member, upon the increase of resistance to the movement of said member beyond a predetermined amount.

As shown in Fig. 1, 1 is a suitable motor or gas engine secured on skids 2 and at the opposite end of the skids a suitable air pump 3 is mounted to force air into a suitable tank 4, said pump and tank being connected by a pipe 5 provided with suitable check valves and arranged in any convenient manner. A piston rod 6 of the air pump is provided with a cross head 7 to which links 8 are pivotally attached at one end, and at their opposite ends said links are pivotally attached to the arms of a forked arm 9 of a bell crank 10, the other arm 11 of the bell crank being connected to a crank arm 12 secured to the hub or shaft of a large gear wheel 13 which is engaged by a pinion 14 on the engine shaft. The parts previously described are constructed and arranged in an old and well known manner and form no part of this invention, the device embodying the invention being contained in the connection between the arm 11 and the crank 12 which connection consists of a connecting rod 15 pivotally attached at 16 to the upper end of the arm 11 and at its opposite end said connecting rod is cut away to form a reduced end 17. Pivotally attached to each side of the connecting rod adjacent to its reduced end are links 18. These links are attached by a bolt 19 passing through one end thereof and through an opening in the connecting rod, and between the opposite end of said links is a roll 20 upon a crank pin 21 carried by the crank 12 and passing through the ends of the links and roll to pivotally attach the links to the crank and hold the roll in place between the links. The links 18 are spaced apart by the connecting rod 15 at one end and by the roll 20 at the other end and a chain 22 is attached at 23 to the reduced end 17 of the connecting rod 15 and passes upward over the roll 20 between the ends of the links 18. To the opposite end of the chain 22 is attached one end of a heavy coiled spring 24 and the opposite end of said spring is attached to an adjusting rod 25 passing through an opening in an upwardly turned end 26 on the rear end of the connecting rod 15. The adjusting rod 25 is screw-threaded and projecting through the opening in the end 26, is provided with an adjusting nut 27 engaging the upturned end which nut may be turned upon the rod to adjust the tension of the spring 24.

Under normal load the bell crank and pump will be actuated by the turning of the crank 12, the links 18 being held substantially in line with the connecting rod 15 with the roll 20 engaging the reduced end 17 of the connecting rod by the tension of the spring 24 which exerts a pull upon the chain 22 running over the roll and attached to the reduced end of the connecting rod. When the pressure in the air tank 4 has been raised to a predetermined point the resistance to the operation of the pump thus created will be sufficient to overcome the tension of the spring 24 which will yield allowing the links 18 to turn upon their pivot 19 out of line with the connecting rod to which they are attached and as the crank 12 turns, the connecting rod will be forced downward as shown in dotted lines in Fig. 2, and said connecting rod will not be reciprocated longitudinally to actuate the bell crank, the bell crank standing still and the connecting rod turning upon its pivot 16.

The spring 24 may be easily and quickly adjusted by the adjusting nut 27 to increase its tension and thus a greater air pressure will be put upon the tank 4 before the resistance to the operation of the pump will be sufficient to overcome the tension of said spring and the same will yield and permit the links 18 to turn.

A very simple and cheap device is thus secured for regulating the air pressure by cutting out the pump the engine running continuously, and thus a great deal of wear and strain on the pump are obviated.

Having thus fully described my invention what I claim is:

1. The combination with a crank and a connecting rod for transmitting motion from said crank, of a link pivotally attached to the side of the connecting rod at one end and to the crank at its opposite end, a flexible member attached at one end to the rod and engaging the link, and a coiled spring attached to the opposite end of said member.

2. The combination of a crank, a connecting rod for transmitting motion from said crank having a reduced end, a link pivotally attached to the crank, a roll on the link, a flexible member attached at one end to the reduced end of the rod and passing over the roll, and a coiled spring attached to the end of said member.

3. The combination of a crank, a connecting rod, links pivotally attached to the sides of the rod at one end and to the crank at the opposite end, a roll between the links in engagement with the rod, a flexible member attached to the rod and engaging the roll, and a coiled spring attached at one end to said member and at its opposite end to the rod.

4. The combination of a crank, a connecting rod, links pivoted at one end to the rod at a distance from its end, a roll between the opposite ends of said links, a chain attached at one end to the end of the rod and extending over the roll, a crank pin extending through the links, and the roll, a coiled spring attached to the end of the chain at one end and to the rod at the other end.

5. The combination of a crank, a connecting rod having an upwardly extending end, links pivoted at one end to the rod near its opposite end and at their other end to the crank, a roll between said links, a chain engaging the roll and attached to the end of the rod, a coiled spring attached at one end to the chain, a screw-threaded rod attached to the other end of said spring and passing through an opening in the upturned end of the connecting rod, and a nut on said screw-threaded rod in engagement with said upturned end.

In testimony whereof I affix my signature in presence of two witnesses.

NORMAN A. WRIGHT.

Witnesses:
OTTO F. BARTHEL,
ANNA M. DORR.